United States Patent [19]

Hagino et al.

[11] 3,787,287

[45] Jan. 22, 1974

[54] PROCESS FOR THE PRODUCTION OF L-TYROSINE

[75] Inventors: Hirohsi Hagino, Tokyo; Kiyoshi Nakayama; Hajime Yoshida, both of Sagamihara, all of Japan

[73] Assignee: Kyowa Hakko Kogyo Co., Ltd., Tokyo, Japan

[22] Filed: July 8, 1971

[21] Appl. No.: 160,933

[30] Foreign Application Priority Data

July 17, 1970 Japan.............................. 45-62062

[52] U.S. Cl..................... 195/29, 195/28 R, 195/47
[51] Int. Cl........................................... C12d 13/06
[58] Field of Search...................... 195/29, 47, 28 R

[56] References Cited

UNITED STATES PATENTS

| 3,709,785 | 1/1973 | Otsuka et al............................ | 195/29 |
| 3,222,258 | 12/1965 | Iizuka et al........................... | 195/29 |

*Primary Examiner*—Alvin E. Tanenholtz
*Attorney, Agent, or Firm*—Joseph M. Fitzpatrick

[57] ABSTRACT

L-tyrosine is produced by culturing an L-tyrosine-producing strain of coryneform glutamic acid-producing bacteria represented by *Corynebacterium glutamicum* in a nutrient medium, accumulating L-tyrosine in the medium and recovering the L-tyrosine therefrom.

15 Claims, No Drawings

3,787,287

PROCESS FOR THE PRODUCTION OF L-TYROSINE

BACKGROUND OF THE INVENTION

The present invention relates to a process for the preparation of L-tyrosine which comprises culturing an L-tyrosine-producing strain of coryneform glutamic acid-producing bacteria represented by *Corynebacterium glutamicum* in a nutrient medium, accumulating L-tyrosine in the culture liquor and recovering same. More particularly the present invention contemplates the use of improved strains of coryneform glutamic acid-producing bacteria represented by *Corynebacterium glutamicum* having high L-tyrosine productivity. Investigators may classify such glutamic acid-producing bacteria as either Micrococcus, Corynebacterium, Brevibacterium, Arthrobacter or Microbacterium. Coryneform glutamic acid-producing bacteria form a taxonomically closely related group of bacteria as described by Abe et al in J. General and Applied Microbiology, Vol. 13, 279 – 301 (1967).

L-tyrosine is an amino acid which is useful as a feed substitute. Therefore, the establishment of a relatively inexpensive, industrial process for the production thereof has been intensively sought.

Heretofore, L-tyrosine has been produced for example by fermentation using a phenylalanine-requiring strain of *Corynebacterium glutamicum* such as disclosed in Japanese Pat. No. 14395/63. However, it would be desirable to obtain higher yields of L-tyrosine than are produced in the process of this publication.

SUMMARY OF THE INVENTION

In the present invention, large amounts of L-tyrosine are formed and accumulated by strains of coryneform glutamic acid-producing bacteria represented by *Corynebacterium glutamicum* which show a resistance to at least one compound selected from the group consisting of analogs of tyrosine and, phenylalanine such as 3-aminotyrosine, 2-aminotyrosine, p-aminophenylalanine, α-methyltyrosine, D-tyrosine, p-fluorophenylalanine, m-fluorophenylalanine, o-fluorophenylalanine, β-2-thienylalanine, 3-hydroxytyrosine, β-2-pyrrolylalanine, β-3-furylalanine, 3,4-dihydroxyphenylalanine, o-hydroxyphenylalanine, m-hydroxyphenylalanine, 5-hydroxy-2-pyridylalanine, p-methylphenylalanine, p-nitrophenylalanine, m-nitrophenylalanine, β-2-naphthylalanine, β-2-pyridylalanine, 3-thianaphthenylalanine, β-3-thiazolealanine, tyrosinehydroxamate, etc. It has also been found that considerable amounts of L-tyrosine are formed and accumulated by the strains which show, in addition to a phenylalanine requirement (including the so called "leaky" type in which the requirement is not absolute), a resistance to said analogs of tyrosine and, phenylalanine. In this connection, the same compound may be an analog of both tyrosine and phenylalanine. p-Fluorophenylalanine, for example, acts as an analog of both tyrosine and phenylalanine.

The strains employed in the present invention are certain type mutant strains of coryneform glutamic acid-producing bacteria represented by *Corynebacterium glutamicum*, having the above-described properties. Preferred species thereof is shown in the working examples hereinbelow, but it can be generally stated that the following L-glutamic acid-producing microorganisms are preferred in connection with the process of the present invention: *Brevibacterium flavum, Brevibacterium glutamigenum, Brevibacterium divaricatum, Brevibacterium lactofermentum, Brevibacterium thiogenitalis, Brevibacterium saccharolyticum, Brevibacterium ammoniagenes, Brevibacterium sp., Corynebacterium callunae, Corynebacterium acetoacidophilum, Corynebacterium melassecola, Corynebacterium herculis,* Corynebacterium sp., Micrococcus sp., *Microbacterium ammoniaphilum, Microbacterium flavum* var. *glutamicum, Arthrobacter globiformis, Arthrobacter citreus* and Arthrobacter sp.

The strains employed in the present invention are those having the above-described properties. The growth of such strains is not inhibited by the existence of the listed compounds, while that of wild type or parent strains is inhibited. The resistance in the present invention is determined usually by checking if a strain can grow in a medium containing 500 γ/ml. an analog though the concentration varies depending upon the strain and the compound employed.

Such property may be given to a strain by mutation induced by conventional methods such as irradiation by ultra-violet light, X-ray, $Co^{60}$, etc., chemical treatment, etc.

When a strain is resistant to one of the listed compounds, it is sometimes also resistant to other compounds. In fact, such cross resistance often occurs between p-fluorophenylalanine and m-fluorophenylalanine or o-fluorophenylalanine. However, a cross resistance hardly occurs between 3-aminotyrosine and p-fluorophenylalanine; 3-aminotyrosine and m-fluorophenylalanine; 3-aminotyrosine and p-aminophenylalanine; 3-aminotyrosine and β-2-thienylalanine; etc. Therefore, when a strain having a resistance to two or more of the listed compounds is requested, a series of mutation treatment is conducted on the parent strain to result the desired resistance step by step.

These strains show several to 10-odd times higher L-tyrosine productivity as compared with that in the process disclosed in Japanese Pat. No. 14395/63. Thus the present invention provides an excellent industrial process for the preparation of L-tyrosine.

DESCRIPTION OF THE INVENTION

Production of L-tyrosine in accordance with the present invention is preferably carried out by fermentation, under aerobic conditions, of an aqueous nutrient medium such as by shaking or aeration and stirring of the culture. It is preferred to maintain the culturing temperature between 20° to 40° C. and the pH approximately neutral during culturing in order to obtain high yields. However, the temperature and pH conditions may vary according to the specific strain of microorganism used.

The culture medium employed in the present invention may be either a synthetic or a natural culture medium as long as it contains appropriate amounts of a carbon source, a nitrogen source, inorganic compounds, and a trace amount of nutrients required by the strain used. Other than the above, there are no special restrictions attached to the other essentials of the medium composition. Any kind of carbon source and nitrogen source that can be assimilated by the strains may be used. For example, as a carbon source, various carbohydrates such as glucose, glycerol, fructose, sucrose, maltose, mannose, starch, starch hydrolysate, molasses, etc. and also various organic acids such as pyruvic acid, lactic acid, acetic acid, fumaric acid, etc. may be used. As a nitrogen source, ammonia or various inorganic and organic ammonium salts such as ammonium chloride, ammonium sulfate, ammonium carbonate, ammonium acetate, etc. or urea and other nitrogenous substances and nitrogenous organic materials such as peptone, NZ-amine, meat extract, yeast extract, corn steep liquor, casein hydrolysate, fish meal or its digested material, defatted soybean cake or its digested material, chrysalis hydrolysate, or the like may be employed. Further, as inorganic compounds, potassium monohydrogen phosphate, potassium dihydrogen phosphate, magnesium sulfate, sodium chloride, ferrous sulfate, manganese sulfate, calcium carbonate or the like may be employed. Where the strain employed has a specific nutrient requirement such as vitamins, amino acids or the like for its growth, such nutrients should also be present in the medium. When these nutrients are already contained within the components present in the medium, it is not necessary specifically to supplement them.

It is preferred that the microorganism be grown in a seed medium prior to being inoculated into a culture medium. The seed medium is incubated under favorable growth conditions for a period of time sufficient to develop a suitable organism population, typically for about 24 hours. The seed medium is then used to inoculate the culture medium. Fermentation is then carried out until a considerable amount of L-tyrosine is produced and accumulated in the resultant medium. Usually after 2 to 5 days of culturing, considerable amounts of L-tyrosine are formed and accumulated in the culture liquor.

After the completion of culturing, the microbial cells are removed, and the L-tyrosine is recovered from the culture liquor by conventional means, such as concentration, precipitation or ion exchange treatment.

Practice of certain specific embodiments of the invention is illustrated by the following representative examples.

Example 1

In this example, an L-tyrosine-producing strain (ATCC 21568) belonging to *Corynebacterium glutamicum* and resistant to a tyrosine analog (3-aminotyrosine) is used. One ml. of seed culture obtained by culturing this strain in a seed medium containing 2 percent glucose, 1 percent peptone, 1 percent yeast extract and 0.3% NaCl at 30° C. for 24 hours is inoculated into a 250 ml. Erlenmeyer flask containing 10 ml. of a fermentation medium. The composition of the fermentation medium used is: 10 percent sucrose, 0.05% $K_2HPO_4$, 0.05% $KH_2PO_4$, 0.025% $MgSO_4 \cdot 7H_2O$, 2 percent ammonium sulfate, 0.5 percent NZ-amine, 30 μg./l. of biotin and 2% $CaCO_3$ (pH 7.2). Culturing is carried out at 30° C. for 4 days with shaking, and 5.7 mg./ml. of L-tyrosine is formed.

After the completion of the fermentation, 1 l. of the culture liquor is adjusted to pH 10 with aqueous ammonia and then centrifuged. The microbial cells and $CaCO_3$ are removed from the liquor. The liquor is then concentrated under a reduced pressure to 50 ml., adjusted to pH 7.0 with hydrochloric acid and left in a cold room. The resulting crystals of L-tyrosine are recovered by filtration and the yield amounts to 3.8 grams.

Example 2

In this example, L-tyrosine-producing strains belonging to *Corynebacterium glutamicum* and having the properties shown in the following Table 1 are used. The strains which show a resistance to two or three analogs are obtained by adding a resistance to each of the analogs step by step by a series of mutation. The phenylalanine-requiring property is added prior to the addition of the resistance. These strains are respectively cultured in a seed medium described in Example 1 for 24 hours with shaking. 1 ml. of each of the thus prepared seed cultures is inoculated into a large test tube containing 10 ml. of a fermentation medium comprising: 10 percent cane balckstrap molasses (calculated as glucose), 0.05% $K_2HPO_4$, 0.05% $KH_2PO_4$, 0.025% $MgSO_4 \cdot 7H_2O$, 2 percent ammonium sulfate, 0.5 percent corn steep liquor and 2% $CaCO_3$ (pH 7.2). Culturing is carried out at 30° C. for 4 days. The results are also shown in Table 1.

TABLE 1

| Strain | Amount of L-tyrosine formed (mg./ml.) |
| --- | --- |
| Phe$^-$, 3AT$^R$ (ATCC 21567) | 6.7 |
| Phe$^-$, 3AT$^R$, PFP$^R$ (ATCC 21569) | 10.3 |
| Phe$^-$, 3AT$^R$, MFP$^R$ (ATCC 21570) | 8.1 |
| Phe$^-$, 3AT$^R$, PAP$^R$ (ATCC 21571) | 7.4 |
| Phe$^-$, 3AT$^R$, TA$^R$ (ATCC 21572) | 7.7 |
| Phe$^-$, 3AT$^R$, PFP$^R$, PAP$^R$ (ATCC 21573) | 12.3 |
| Phe$^-$, MFP$^R$ (ATCC 21562) | 5.8 |
| Phe$^-$, OFP$^R$ (ATCC 21564) | 6.0 |
| Phe$^-$, PFP$^R$ (ATCC 21565) | 5.8 |
| PFP$^R$ (ATCC 21566) | 4.9 |
| MFP$^R$ (ATCC 21563) | 4.3 |

Phe$^-$: requiring phenylalanine
3AT$^R$: resistant to 3-aminotyrosine
PFP$^R$: resistant to p-fluorophenylalanine
MFP$^R$: resistant to m-fluorophenylalanine
PAP$^R$: resistant to p-aminophenylalanine
TA$^R$: resistant to β-2-thienylalanine
OFP$^R$: resistant to o-fluorophenylalanine Example 3

In this example, an L-tyrosine-producing strain (ATCC 21569) of *Corynebacterium glutamicum*, which is resistant to 3-aminotyrosine and p-fluorophenylalanine and requires phenylalanine is used.

The strain is cultured in a seed culture medium comprising 7 percent cane black-strap molasses (calculated as glucose), 0.3 percent corn steep liquor, 0.1% $K_2HPO_4$, 0.1% $KH_2PO_4$, 0.05% $MgSO_4 \cdot 7H_2O$ and 0.9 percent decomposed soybean cake liquor (calculated as soybean cake, prepared by decomposing soybean cake with 6N $H_2SO_4$ followed by neutralization with aqueous ammonia) for 24 hours. 300 ml. of the thus prepared seed culture is inoculated into a 5 l. jar fermenter containing 3 l. of a fermentation medium comprising: 15 percent cane balckstrap molasses (calculated as glucose), 0.1 percent corn steep liquor, 0.1% $KH_2PO_4$, 0.1% $K_2HPO_4$, 0.05% $MgSO_4 \cdot 7H_2O$ and 0.9 percent decomposed soybean cake liquor (calculated as soybean cake) (pH 7.2).

Culturing is carried out at 30° C. for 72 hours with aeration of 3 l./min. and stirring at 600 r.p.m. As a result, 15.6 mg./ml. of L-tyrosine is formed. The specific strains of preferred microorganisms set forth in the above examples have been deposited with the American Type Culture Collection, Rockville, Maryland and have been accorded the noted accession numbers.

What is claimed is:

1. The process for producing L-tyrosine which comprises culturing an L-tyrosine producing strain belonging to the genus Corynebacterium and having a resistance to at least one compound selected from the group consisting of analogs of tyrosine and phenylalanine, in a nutrient culture medium, accumulating L-tyrosine in said medium and recovering L-tyrosine from said medium.

2. The process according to claim 1 wherein the L-tyrosine producing strain is resistant to 3-aminotyrosine, p-fluorophenylalanine, m-fluorophenylalanine, p-aminophenylalanine, β-2-thienylalanine or o-fluorophenylalanine.

3. The process according to claim 1 wherein said strain of *Corynebacterium glutamicum* is a phenylalanine requiring microorganism.

4. The process according to claim 1 wherein said strain is *Corynebacterium glutamicum* (ATCC 21568).

5. The process according to claim 1 wherein said strain is *Corynebacterium glutamicum* (ATCC 21567).

6. The process according to claim 1 wherein said strain is *Corynebacterium glutamicum* (ATCC 21569).

7. The process according to claim 1 wherein said strain is *Corynebacterium glutamicum* (ATCC 21570).

8. The process according to claim 1 wherein said strain is *Corynebacterium glutamicum* (ATCC 21571).

9. The process according to claim 1 wherein said strain is *Corynebacterium glutamicum* (ATCC 21572).

10. The process according to claim 1 wherein said strain is *Corynebacterium glutamicum* (ATCC 21573).

11. The process according to claim 1 wherein said strain is *Corynebacterium glutamicum* (ATCC 21562).

12. The process according to claim 1 wherein said strain is *Corynebacterium glutamicum* (ATCC 21564).

13. The process according to claim 1 wherein said strain is *Corynebacterium glutamicum* (ATCC 21565).

14. The process according to claim 1 wherein said strain is *Corynebacterium glutamicum* (ATCC 21566).

15. The process according to claim 1 wherein said strain is *Corynebacterium glutamicum* (ATCC 21563).

* * * * *